US009254830B2

(12) United States Patent
Schneider et al.

(10) Patent No.: US 9,254,830 B2
(45) Date of Patent: Feb. 9, 2016

(54) DETERMINING A BRAKING FORCE FOR A RAIL VEHICLE

(75) Inventors: Stefan Schneider, Munich (DE); Michael Schubert, Munich (DE); Jasmina Brackovic, Munich (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 4 days.

(21) Appl. No.: 14/342,733

(22) PCT Filed: Sep. 7, 2012

(86) PCT No.: PCT/EP2012/067517
§ 371 (c)(1),
(2), (4) Date: Mar. 18, 2014

(87) PCT Pub. No.: WO2013/034693
PCT Pub. Date: Mar. 14, 2013

(65) Prior Publication Data
US 2014/0229057 A1   Aug. 14, 2014

(30) Foreign Application Priority Data
Sep. 9, 2011   (DE) .......................... 10 2011 113 093

(51) Int. Cl.
*B60T 8/18*   (2006.01)
*B60T 8/17*   (2006.01)
*B60T 17/22*   (2006.01)
*B60T 8/1763*   (2006.01)

(52) U.S. Cl.
CPC ............... *B60T 17/22* (2013.01); *B60T 8/1705* (2013.01); *B60T 8/17636* (2013.01); *B60T 8/1893* (2013.01)

(58) Field of Classification Search
CPC .............................. G01C 5/286; B60T 8/1893
See application file for complete search history.

(56) References Cited

U.S. PATENT DOCUMENTS

| 5,588,716 | A  | * | 12/1996 | Stumpe ............................. 303/7 |
| 5,820,226 | A  | * | 10/1998 | Hart ................................. 303/7 |
| 6,332,354 | B1 | * | 12/2001 | Lalor et al. ...................... 73/121 |
| 8,239,078 | B2 | * | 8/2012  | Siddappa et al. ............... 701/19 |
| 8,645,011 | B2 | * | 2/2014  | Schaffler ........................ 701/20 |

(Continued)

FOREIGN PATENT DOCUMENTS

| CN | 1176497 A | 3/1998 |
| CN | 101750218 A | 6/2010 |

(Continued)

OTHER PUBLICATIONS

Machine translation of EP1288095, retrieved from espacenet.com on Apr. 17, 2015.*
Machine translation of DE 102008015873, retrieved from espacenet. com on Apr. 17, 2015.*

(Continued)

*Primary Examiner* — Mussa A Shaawat
*Assistant Examiner* — Thomas Ingram
(74) *Attorney, Agent, or Firm* — Barnes & Thornburg LLP

(57) ABSTRACT

A control device for a brake system of a rail vehicle, wherein the brake system includes a friction bracket device which is dependent on frictional engagement. The control device determines a braking effect applied during a braking process on the basis of a brake pressure or brake current and at least one further parameter. Also disclosed are a brake system having such a control device and a method for determining a braking effect.

10 Claims, 3 Drawing Sheets

(56) References Cited

U.S. PATENT DOCUMENTS

| | | | |
|---|---|---|---|
| 2003/0200020 A1* | 10/2003 | Ring | 701/70 |
| 2009/0255329 A1 | 10/2009 | Connell et al. | |
| 2010/0235022 A1 | 9/2010 | Siddappa et al. | |
| 2011/0089755 A1* | 4/2011 | Itano et al. | 303/14 |

FOREIGN PATENT DOCUMENTS

| | | | |
|---|---|---|---|
| CN | 102015393 A | | 4/2011 |
| DE | 3803639 A1 | | 8/1988 |
| DE | 4242392 A1 | | 6/1994 |
| DE | 10148541 A1 | | 4/2003 |
| DE | 102008015873 A1 | | 10/2009 |
| EP | 1288095 A2 | | 3/2003 |
| EP | 2192018 A2 | | 6/2010 |

OTHER PUBLICATIONS

Machine translation of DE 10148541, retrieved from espacenet.com on Apr. 17, 2015.*

Search Report for International Patent Application No. PCT/EP2012/067517; Mar. 8, 2013.

International Preliminary Report on Patentability and Written Opinion of the International Search Authority for international Patent Application No. PCT/EP2012/067517, dated Sep. 7, 2012.

English Translation of International Preliminary Report on Patentability and Written Opinion of the International Search Authority for International Patent Application No. PCT/EP2012/067517, dated Sep. 7, 2012.

Chinese Office Action for Chinese Patent Application No. 201288843945.0, dated Jul. 23, 2015, along with English Translation.

* cited by examiner

DETERMINING A BRAKING FORCE FOR A RAIL VEHICLE

PRIORITY CLAIM

This patent application is a U.S. National Phase of International Patent Application No. PCT/EP2012/067517, filed 7 Sep. 2012, which claims priority to German Patent Application No. 10 2011 113 093.8, filed 9 Sep. 2011, the disclosures of which are incorporated herein by reference in their entirety.

FIELD

Disclosed embodiments relate to a control device for a brake system of a rail vehicle, to a brake system for a rail vehicle having such a control device and to a method for determining a braking effect exerted during braking of a rail vehicle.

BACKGROUND

In modern rail vehicles a large number of braking force sensors may be provided to detect braking forces or braking torques during a braking process. Knowledge of such braking forces or braking torques is very useful for controlling or regulating a braking process since, in particular, wheel locking states can be avoided and a frictional engagement between wheel and rail as large as possible can be effectively utilized for the braking process. However, such sensors are costly and require considerable maintenance work.

Disclosed embodiments make it possible to determine a braking effect, in particular a braking force and/or a braking torque, with as few braking force sensors or braking torque sensors as possible.

BRIEF DESCRIPTION OF THE FIGURES

Disclosed embodiments will now be explained with reference to the appended drawings. In the drawings.

DETAILED DESCRIPTION OF THE DISCLOSED EMBODIMENTS

Figure 1:
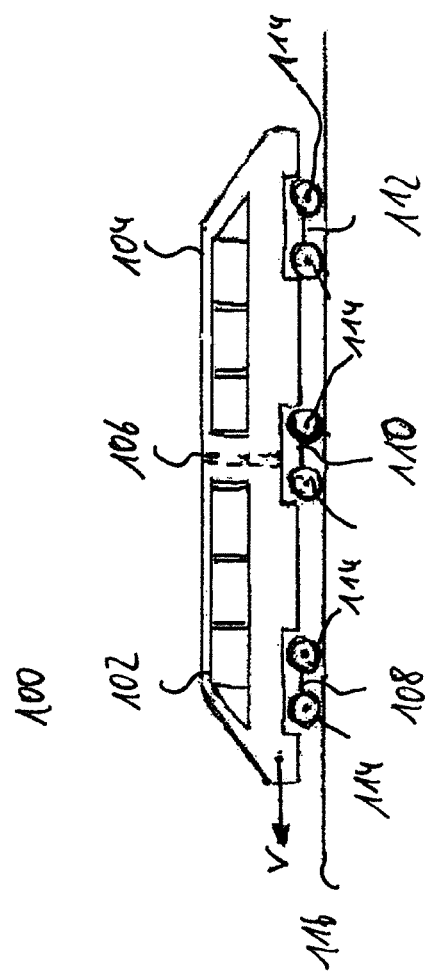
FIG. 1 is a schematic representation of a rail vehicle.

In the context of this description a rail vehicle may refer to one or more cars with or without their own drive means and/or a traction vehicle in any combination. In particular, a rail vehicle may have motor-driven cars. A rail vehicle or a car of the rail vehicle may have bogies on which wheel axles of the vehicle are arranged. The bogies may be fastened to a car superstructure. A brake system may be a pneumatic, in particular an electropneumatic, brake system or a hydraulic, in particular an electrohydraulic, brake system. It is possible that a brake system is an electric or electromechanical brake system. A brake system may comprise one or more brake apparatuses which may include, in particular, one or more non-positive friction brake devices. A friction brake device dependent on non-positive engagement may be configured to brake a wheel or a wheel axle of a rail vehicle by friction. In this case a friction brake device dependent on non-positive engagement transmits a braking force via a wheel/rail contact. By contrast, brake arrangements which do not transmit a braking force via a wheel/rail contact, for example electromagnetic rail brakes, are not regarded as friction brake devices dependent on non-positive engagement within the meaning of this description.

A friction brake device dependent on non-positive engagement may be, in particular, a disk brake device, a block brake device or a combined disk/block brake device. A brake device, in particular a friction brake device dependent on non-positive engagement, may be a pressure-actuated brake device, for example a pneumatic or hydraulic brake device. It is possible that a brake device, in particular a friction brake device dependent on non-positive engagement, is an electrically actuated brake device, for example an electric or electromechanical brake device.

A pressure-actuated brake device may have electrically activatable valves such as solenoid valves and/or electrically activatable pilot valves. Accordingly, such a pressure-actuated brake device may be referred to as an electropneumatic or electrohydraulic brake device.

A brake apparatus, in particular a friction brake apparatus dependent on non-positive engagement, may comprise one or more friction brake devices. At least one force generator may be associated with a friction brake device, which force generator is able to convert a pneumatic or hydraulic braking pressure or an electric braking current supplied to it into a braking force for actuating the friction elements of the friction brake device.

A brake device having a force generator which can convert a braking pressure into a braking force may be regarded as a pressure-actuated brake device, for example as a pneumatic or hydraulic brake device. A brake device having a force generator which can convert an electric braking current into a braking force may be regarded as an electrically actuated brake device, for example an electric or electromechanical brake device. A friction brake device may be configured to generate a braking torque acting on a wheel and/or axle of the vehicle upon application of a pneumatic or hydraulic braking pressure or a braking current to one or more force generators.

A brake apparatus or a friction brake device may have a force generator such as a pneumatic or hydraulic cylinder which, upon being subjected to a pressure, actuates the friction brake device for a braking process. A friction brake device may, in particular, have a plurality of friction elements which are provided to rub against one another when subjected to a braking force by a force generator. The application of a braking force to at least one friction element of a brake apparatus or of a friction brake device of a brake apparatus may be regarded as actuation of the brake apparatus or of the friction brake device. In particular, at least one friction pair comprising two friction elements may be provided. For example, a friction brake device may have a brake disk which is configured, upon actuation of the brake, to be brought into frictional contact with one or more brake shoes provided with a brake lining.

Alternatively, a friction brake device may have one or more brake blocks with associated brake linings which, upon actuation of the brake, are brought into frictional contact with a wheel surface of a wheel. The pressure exerted on the force generator or on a pressure-actuated cylinder to actuate the friction brake device may be referred to as the braking pressure. Correspondingly, an electric current which can be converted into a braking force by a force generator may be referred to as a braking current. The friction brake device may be configured to brake an independently suspended wheel and/or a wheel axle which has at least two wheels rigidly connected to one another.

A friction brake device may therefore be associated with at least one wheel. In this case a friction brake device may be arranged on or attached to the bogie on which the axle and/or the wheel associated with it is/are arranged. The force exerted by the force generator upon actuation of a friction brake device may be referred to as the braking force. The braking force depends on the braking pressure exerted or the braking current applied, and on the design, condition and operation of the friction brake device. The torque which is exerted on a wheel during braking may be referred to as the braking torque. The braking torque depends, in particular, on the braking force and on the wheel geometry, in particular on a wheel diameter. Braking force may also act on a non-moving wheel, for example to bring a brake lining into contact with a wheel running surface or a brake disk. In the case of a moving wheel, a braking force generates an associated braking torque.

A brake control device may be an electronic control device for a brake system of a rail vehicle. The brake control device may be, for example, an anti-slip computer, a brake computer or other control device configured as a control device of the brake system of a rail vehicle. A braking pressure sensor device which is able to detect a braking pressure may be provided. It is possible that a braking current sensor device which is able to detect a braking current is provided. A control device may be configured to receive a detected braking pressure from the braking pressure sensor device.

A braking effect sensor device may be configured to detect an actual braking effect which is exerted on a wheel and/or an axle. It is possible, in particular, that a braking effect sensor device is configured as a braking force sensor device which is able to detect a braking force exerted on at least one friction brake device associated with it, and/or an associated braking torque. A braking effect sensor device may therefore be configured, for example, to detect a braking force exerted by at least one friction brake device and/or a braking torque exerted by the at least one friction brake device. For this purpose a braking effect sensor device may include, for example, one or more sensors which may be arranged, for example, at an attachment point between a friction brake device and a bogie. A braking effect sensor device may comprise, in particular, one or more strain gauges.

Elements, such as sensors, of the braking effect sensor device may be arranged on moving and/or rigid elements of the friction brake device and/or on its attachment means, to measure, upon actuation of the friction brake device, a reaction which is generated by a friction partner such as a wheel or a brake disk. The braking force and/or the braking torque can be deduced from such a reaction. Such a reaction may be manifested by a deformation which is detectable, for example, by strain gauges. The braking effect sensor device may be provided to detect the braking force and/or the braking torque for more than one friction brake device. In general, a sensor device can provide signals which represent measurement results. Such signals may be represented by corresponding data which can be received by a control device. The acquisition of data may include the reception and/or processing of data which is transmitted by a sensor device and/or a control device. The processing of data may include the performing of calculations.

Disclosed embodiments relate to a control device for a brake system of a rail vehicle wherein the brake system includes a friction brake device dependent on non-positive engagement and wherein the control device is designed to determine a braking effect exerted during a braking process on the basis of a braking pressure and at least one further parameter. A braking effect sensor such as a braking force sensor or braking torque sensor for determining the braking effect can therefore be dispensed with. The braking effect may be a braking effect which is generated by the friction brake device dependent on non-positive engagement. In particular, the friction brake device dependent on non-positive engagement may be actuated during the braking process. The at least one parameter may be a parameter which does not correspond to a braking force and/or a braking torque exerted.

The control device may be an electronic control device, in particular a brake control device which is able to activate components of the brake system. It is also possible that the control device is a higher-level control device such as a train computer. In addition to a friction brake device dependent on non-positive engagement, the brake system may include further brake devices, for example an electromagnetic rail brake device, a linear eddy current brake device and/or a retarder device. The friction brake device may be a pressure-actuated brake device such as a pneumatic and/or hydraulic brake device. It is also possible that the friction brake device is an electrically actuated brake device. The control device may be, in particular, an electronic control device which may be configured to receive braking pressure data which indicates or relates to a braking pressure, and further data which is associated with or relates to the at least one further parameter.

The braking pressure may be a braking pressure detected by a braking pressure sensor device and transmitted directly or indirectly to the control device. It is also possible that the braking pressure is determined or calculated, for example by the control device, on the basis of data from a braking pressure sensor device. It is possible that the control device is an electronic control device which may be configured to receive braking current data which indicates or relates to a braking current, and further data which is associated with or relates to the at least one further parameter. The braking current may be a braking current detected by a braking current sensor device and transmitted directly or indirectly to the control device. It is also possible that the braking current is determined or calculated, for example by the control device, on the basis of data from a braking current sensor device.

The control device may be configured to activate the brake system and/or the friction brake device dependent on non-positive engagement on the basis of the braking effect determined. It is possible that the control device is configured to monitor and/or store the time progression of a braking pressure or of a braking current and of the at least one further parameter. The determination of the braking effect may take place during the braking process. The braking effect may relate to at least one braking force exerted on a part of the vehicle and/or a braking torque exerted on a part of the vehicle. In particular, the braking effect may be a braking force exerted on a friction brake device of the friction brake apparatus dependent on non-positive engagement and/or a braking torque exerted on a wheel associated with the friction brake device.

The braking pressure may be a braking pressure which is exerted to actuate at least one friction brake device of a pressure-actuated brake apparatus and is detected by a suitable sensor device. The braking current may be a braking current which is applied to actuate at least one friction brake device of an electrically actuated brake apparatus and is detected by a suitable sensor device.

It may be provided that the control device is configured to detect and/or determine a braking pressure or braking current for more than one friction brake device of the brake apparatus. In particular different braking pressures or braking currents may be determined. In this case braking pressure values may be determined at different locations on the vehicle and made available to the control device.

It is possible that braking currents are detected at different locations on the vehicle and/or centrally at the current supply for electrically actuated friction brake devices, and made available to the control device. The control device may be configured to determine the braking effect on the basis of braking pressures or braking currents which are associated with a plurality of locations on the rail vehicle and/or the friction brake devices. It is possible that the at least one further parameter is determined at a plurality of measuring points which are associated with a plurality of friction brake devices and/or a plurality of locations with which braking pressures or braking currents are associated. The control device may be configured to associate the data relating to the at least one further parameter determined at different measuring locations with brake pressures or brake currents associated with corresponding locations and/or friction brake devices.

The at least one further parameter may comprise a deceleration. The deceleration may be an overall deceleration of the vehicle. Alternatively or additionally, it may be provided that the deceleration is a deceleration of a part of the vehicle. The deceleration may be, for example, a deceleration occurring at a bogie or at a car of the rail vehicle. It is possible that the control device is configured to determine the deceleration on the basis of speed data, for example on the basis of data relating to a vehicle speed. The deceleration may be deduced from a time progression and/or a change of the vehicle speed. In this case the deceleration may be determined by viewing the progression of the speed within time intervals which are shorter than the duration of a braking process.

To determine the deceleration, one or more accelerometers may be provided. In particular, an accelerometer for determining an overall deceleration of the vehicle may be provided. Such an accelerometer may be arranged, for example, on a car and/or on a bogie. It may be provided that at least one accelerometer is allocated to each vehicle and/or each bogie. Such sensors are frequently provided to monitor running states, so that already following sensors can be further used to determine the braking effect. An accelerometer may be configured to determine a longitudinal acceleration and/or a lateral acceleration and/or a yaw acceleration.

The at least one further parameter may comprise a vehicle speed and/or at least one wheel rotational speed. The control device may be connected or connectable to a sensor device for determining a vehicle speed and/or at least one wheel rotational speed. To determine the vehicle speed, a radar system, an optical sensor device and/or a communication device for receiving satellite data, may, for example, be provided, with which system/devices the control device may be connectable or connected.

As a rule, the vehicle speed and the wheel rotational speed are also parameters already present which can therefore be used to determine a braking effect. The vehicle speed may be, in particular, an overall speed of the vehicle, from which the individual speeds of individual cars may deviate slightly. It is possible that the vehicle speed is determined on the basis of wheel rotational speed data. However, it is advantageous if a vehicle speed determination acting independently of the wheel rotational speeds is carried out.

It is possible that the control device is configured to determine from wheel rotational speed data associated with individual wheels or wheel axles a speed associated with the respective wheel or the respective wheel axle, for example a rotational speed or a wheel speed. For this purpose the radius of the wheel may be taken into account in addition to wheel rotational speed data. The control device may be configured to compare individual wheel speeds with a reference speed. The reference speed may be a vehicle speed determined independently of wheel rotational speed data or a reference speed determined, for example, from a maximum wheel rotational speed.

A local braking torque at the individual wheels or wheel axles may be deduced from a comparison of braking pressure and the deviation of individual wheel speeds from the reference speed. In particular, wheels or wheel axles in the case of which an associated braking pressure or braking current leads to a braking force which is greater than the force which can be absorbed via the wheel/rail contact can be identified. Such wheels are liable to slipping or locking. The danger of slipping or locking of individual wheels can therefore be detected at an early stage and the brake system or the pressure-actuated brake apparatus can be activated by a suitable brake control device, such as the control device described, in such a way that slip or locking is counteracted.

In a development, the at least one parameter may comprise a rotational speed change of at least one wheel. A deceleration at an associated wheel or an associated wheel axle can, for example, be deduced from the wheel rotational speed change.

The control device may be configured to monitor a time progression of the braking pressure or braking current and of the at least one further parameter during braking. Especially if the at least one further parameter is a wheel rotational speed and/or a wheel rotational speed change, the progression of the friction quality between the wheels and the rail can be determined or monitored.

It may be advantageous to configure the control device to activate a test braking process. During a test braking process the braking pressure or braking current and the at least one further parameter can be monitored and the braking effect can be determined on the basis of these parameters. For a test braking process a given, optionally small braking pressure or braking current may be applied. The test braking process may be carried out without a specific braking request and with a braking pressure or braking current which is independent of a given deceleration.

For it is not the purpose of the test braking process to reduce the running speed noticeably. Instead, the effect of the brake system, especially of the friction brake apparatus dependent on non-positive engagement, is to be monitored. It may be provided that the control device is configured to detect rotational speed changes of different wheels and/or wheel axles and/or for wheels on different bogies during a test braking process. It may be provided, in particular, for a test braking process that not all friction brake devices are activated simultaneously for a braking process, but only single friction brake devices or groups thereof. It is possible that the control device is configured to activate individual friction brake devices distributed over the rail vehicle with a given braking pressure or braking current and to capture the respective braking pressure or braking current and an associated wheel rotational speed change.

A selective test braking process can therefore be carried out. From a test braking process activated in this way the progression of a friction quality or of a coefficient of friction can be determined over the length of the rail vehicle at least as a tendency. A prediction regarding the prospective state of the line can also be made on this basis. In particular, it may be provided that at least one friction brake device on a front car or bogie of the rail vehicle, viewed in the direction of travel, and on a rear, in particular last car or bogie of the rail vehicle, viewed in the direction of travel, are each activated with a respective predetermined braking pressure or braking current for a selective braking process. Depending on the length of the rail vehicle, further friction brake devices may be activated. In this way a difference in the frictional engagement between a front portion of the rail vehicle and a rear portion of the rail vehicle may be determined, in particular from a braking effect.

Alternatively or additionally, a control device for a brake system of a rail vehicle is provided, the control device being configured to determine a braking effect exerted during a braking process on the basis of longitudinal forces between parts of the rail vehicle, and a change of a speed over time. The parts of the vehicle may be vehicle parts which are movable with respect to one another, in particular vehicle elements which are not rigidly connected to one another, and/or cars of the vehicle. The control device may be configured to take over additionally one or more of the further functions described herein. Suitable force transducers may be provided to measure longitudinal forces. Such force transducers may be provided, in particular, between different cars or elements of the rail vehicle which are movable with respect to one another.

The force transducers are configured to detect the longitudinal forces exerted between these cars or elements during a braking process. The change of speed over time may be, in particular, the change of a vehicle speed over time. For this purpose a suitable vehicle speed sensor may be provided. It is also possible that an accelerometer is provided to determine the change of speed over time. In this way, therefore, a braking effect, in particular a braking force and/or a braking torque, can also be determined without the use of braking force or braking torque sensors, at least for individual cars or elements of the vehicle.

Disclosed embodiments of a brake system for a rail vehicle having a control device described herein is further provided.

In addition, disclosed embodiments relate to a method for determining a braking effect exerted during a braking process of a rail vehicle, in which the braking effect is determined on the basis of a braking pressure or braking current and at least one further parameter. Alternatively or additionally, the braking effect may be determined on the basis of longitudinal forces acting between parts of the rail vehicle and a change of a speed over time. The determination of the braking effect may be carried out by a control device described herein. The brake system may be a brake system described herein which, in particular, may include a friction brake apparatus dependent on non-positive engagement described herein. The at least one further parameter may comprise a deceleration. It is possible that the at least one further parameter includes a vehicle speed and/or at least one wheel rotational speed. The at least one parameter may comprise a wheel rotational speed change.

It is possible that a time progression of the braking pressure or braking current and of the at least one further parameter is monitored during the braking process. The monitoring may be carried out by the control device. The braking pressure or braking current for a plurality of different friction brake devices may be detected. In particular, the determination of a braking effect for different friction brake devices and/or wheel axles and/or bogies is possible. Test braking processes may be activated by the control device.

Furthermore, a rail vehicle having a brake system described herein and/or a control device described herein may be provided.

The control devices and methods described herein make it possible to determine a braking effect even without braking force sensors or braking torque sensors. It may be advantageous in this case if the control device utilizes a plurality of the further parameters described to determine a braking effect, to increase the accuracy of the determination of the braking effect. It may be especially advantageous if the determination of the braking effect described is carried out by the control device additionally to the determination of a braking effect by means of braking force sensors or braking torque sensors. Independent arrangements and methods for determining the braking effect which can be used for reciprocal plausibility checking are thereby made available.

In addition, it may be provided that the control device is configured also to take account of data from braking force sensors and/or braking torque sensors in determining the braking effect. In particular, braking force sensors and/or braking torque sensors may be associated with particular individual friction brake devices, while such sensors are not associated with other friction brake devices. The control device may take account of the braking force or the braking torque determined by the sensors for individual friction brake devices as a basis for a further determination of the braking effect for the other friction brake devices. In particular, it may be provided that data from braking force sensors and/or braking torque sensors for individual friction brake devices is used by the control device for gauging or calibrating the determination of the braking effect for the friction brake devices without associated braking force sensors and/or braking torque sensors.

It is possible that the control device is configured to receive braking force data and/or braking torque data associated with individual friction brake devices and to calibrate the determination of the braking effect on the basis of this data. In particular, the control device may be configured to calibrate the determination of the braking effect on the basis of a braking pressure or braking current and at least one further parameter, and/or on the basis of longitudinal forces acting between vehicle parts and of a change of a speed over time. In the calibration, a braking effect for a friction brake device determined using one of the approaches described herein may be normalized to a braking force and/or a braking torque which has been determined for the same friction brake device using a braking force sensor and/or a braking torque sensor. Braking effects for friction brake devices with which braking force sensors or braking torque sensors are not associated may be normalized in a corresponding way.

FIG. 1 shows schematically a rail vehicle 100. The rail vehicle 100 comprises two elements 102 and 104 which are connected movably to one another. A coupling device 106 is provided to connect the vehicle elements 102, 104. In this example the rail vehicle 100 has three bogies 108, 110, 112, on each of which two wheel axles are provided. Wheels 114 which run on a rail 116 are provided on each of the bogies 108, 110, 112. The direction of travel of the vehicle is represented by the arrow on the vehicle element 102, with the vehicle speed v. The vehicle element 102 therefore represents the front vehicle element while the vehicle element 104 represents the rear vehicle element.

A multiplicity of sensors (not shown in detail) may be provided on the rail vehicle 100. For example, longitudinal force sensors which are able to determine forces acting between the vehicle elements 102, 104 in the longitudinal direction may be provided in the region of the coupling device 106. The rail vehicle 100 may have one or more sensors for determining the vehicle speed and/or an acceleration or deceleration. For this purpose, sensors for determining longitudinal, yaw and/or lateral accelerations, for example, may be used. In addition, braking pressure sensors or braking current sensors and/or braking effect sensors, such as braking force or braking torque sensors, associated with the bogies or with friction brake devices of a friction brake apparatus dependent on non-positive engagement arranged on the bogies, may be provided. In general, a braking pressure sensor or braking current sensor may be regarded as associated with a friction brake device if it is able to detect a braking pressure or braking current individually actuating the friction brake device.

A braking force sensor or braking torque sensor may be regarded as associated with a friction brake device or wheel axle to be braked by the friction brake device if it is able to detect a braking force or a corresponding braking torque exerted by the friction brake device. In addition, wheel rotational speed sensors may be provided to determine the wheel rotational speed of at least one wheel axle. In general, sensors may be connected to a control device which is able to receive appropriate data from the sensors.

A speed change and/or a change of a wheel rotational speed may, for example, be determined by the control device from the sensor data and optionally associated with corresponding wheels, bogies and/or friction brake devices. The control device determines, in particular, the braking pressure or braking current and at least one further parameter on the basis of sensor data supplied. Alternatively or additionally, a longitudinal force or coupling force acting between the vehicle elements may be determined by the control device. On the basis of this data, the control device can determine a braking effect, in particular an overall braking force or overall braking torque, acting on the vehicle independently of braking force or braking torque sensors. The number of braking force sensors can thereby be at least reduced.

Figure 2:
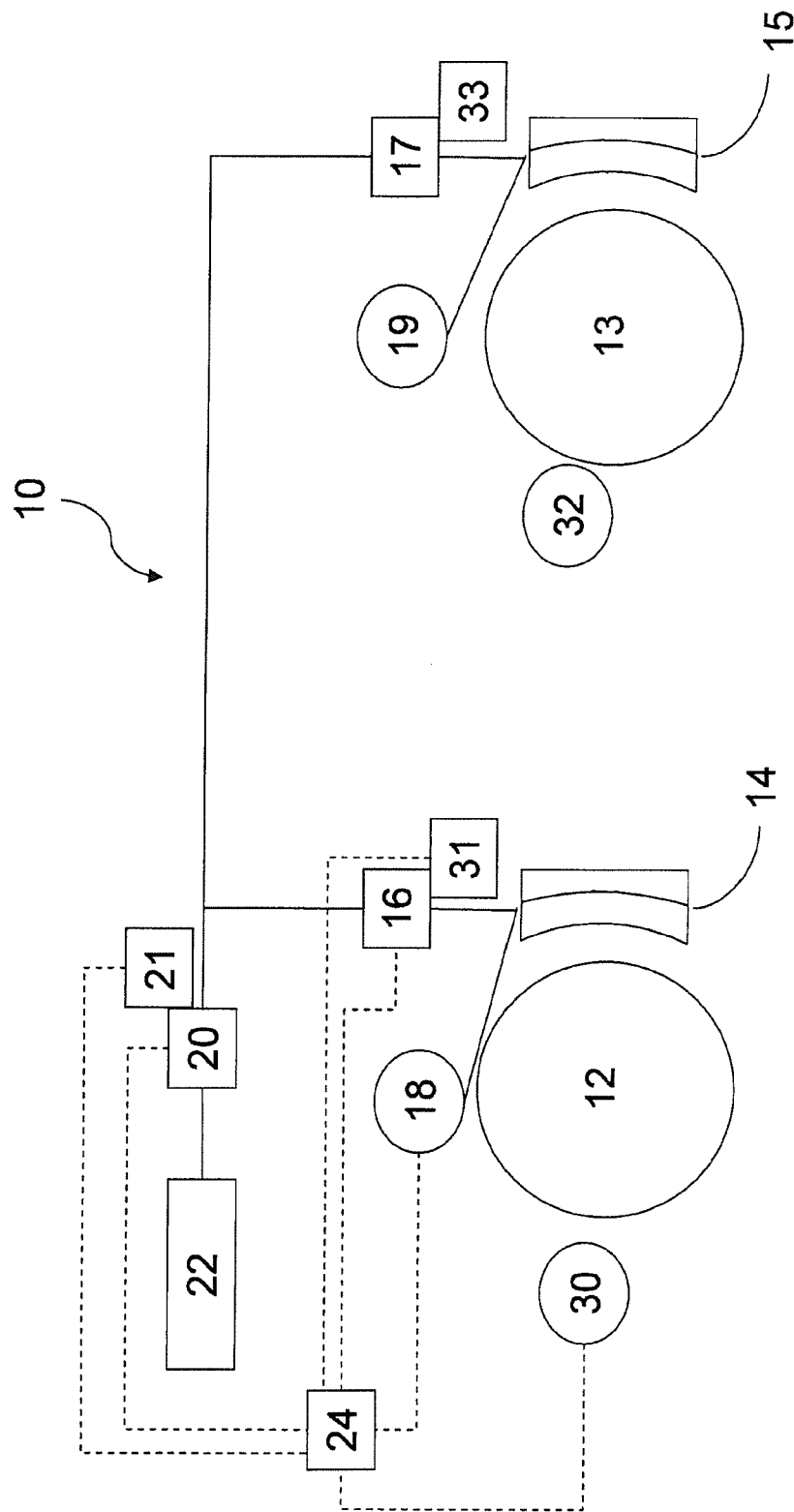
FIG. 2 is a schematic representation of a brake system of a rail vehicle having a brake control device.

FIG. 2 shows an example of a brake system which can be used, for example, with the vehicle of FIG. 1. FIG. 2 shows schematically a brake system 10 of a rail vehicle which in this case comprises a pneumatic block brake device as the friction brake device dependent on non-positive engagement. Mechanical and pneumatic connections and conduits are represented by continuous lines while electrical connections or communication channels are represented by broken lines. The brake system 10 is provided to brake wheels 12 and 13 of the rail vehicle. In this example the wheels 12 and 13 are located on different wheel axles. A first brake block 14 is associated with the first wheel 12.

A second brake block 15 is associated with the second wheel 13. Each of the brake blocks 14, 15 has a brake lining which brakes the associated wheel when the brake block with the brake lining is pressed against the running surface of the associated wheel 12, 13. The brake block 14 can be actuated for braking by a force generator 16. The force generator 16 is connected via a supply line to a main control valve arrangement 20. Compressed air can be supplied to the force generator 16 via the main control valve arrangement 20. Similarly, a force generator 17, which can likewise be supplied, via the main control valve arrangement 20, with compressed air for actuating the force generator to bring the brake block 15 into contact with the running surface of the wheel 13, is associated with the brake block 15. The main control valve arrangement 20 is connected to a compressed air reservoir 22 from which it can draw compressed air to supply it to the force generators 16, 17 in the event of a braking process.

An electronic brake control device 24 of a brake computer is further provided and is able to activate the main control valve arrangement 20. For this purpose the main control valve arrangement 20 may comprise, in particular, one or more solenoid valves which can be activated by the brake control device 24. For reasons of clarity, the electrical control lines for the components associated with the second wheel are not shown. They are, however, comparable to the control lines associated with the first wheel and its components. A braking effect sensor 18 which is able to determine a braking force and/or a braking torque exerted on the brake block 14 during braking is further associated with the first wheel 12. The braking effect sensor 18 can therefore be regarded as a braking force sensor. Such a braking effect sensor may include, for example, one or more strain gauges. The sensor 18 is connected for data transmission to the electronic brake control device 24. In addition, a first wheel rotational speed sensor 30 which can detect the rotational speed of the wheel 12 is associated with the wheel 12.

This sensor is also connected for data transmission to the electronic control device 24. Analogously, a second braking effect sensor 19 which can determine a braking force and/or a braking torque exerted on the brake block 15 is associated with the second wheel. In addition, a second wheel rotational speed sensor 32 is associated with the second wheel 13. The sensors 18, 19 can each be regarded as parts of a braking effect sensor arrangement. The wheel rotational speed sensors 30, 32 can each be regarded as parts of a wheel rotational speed sensor arrangement. The force generators 16, 17 may each include pneumatic cylinders which, when subjected to a braking pressure, exert a braking force on the associated brake block 14, 15. The force generators 16, 17 may each further have a control valve device which can be activated by the electronic control device 24, via which control valve device a main brake pressure provided by the main control valve arrangement 20 can be set individually for the respective pneumatic cylinders of the force generators 16, 17.

In particular, the force generators 16, 17 can therefore apply different braking pressures to the brake blocks 14, 15 in accordance with the electronic control device 24, and can therefore actuate or activate the friction brake devices asymmetrically or separately. A main brake pressure sensor 21 which can detect the main brake pressure supplied by the main control valve arrangement 20 is associated with the main control valve arrangement 20. The pressure sensor 21 is connected for data transmission to the electronic control device 24. In addition, a first braking pressure sensor 31 is associated with the force generator 16 and a second braking pressure sensor 33 with the second force generator 17. The first and second braking pressure sensors 31, 33 are each configured to detect the braking pressure supplied individually for generation of a braking force by the associated force generator 16, 17. The sensors 31, 33 and the main brake pressure sensor 21 may be regarded as parts of a brake pressure sensor arrangement.

The brake pressure sensors 21, 31, 33 are also connected for data transmission to the electronic brake control device 24. The electronic brake control device 24 can therefore, on the one hand, detect the main brake pressure produced upstream of the main control valve arrangement 20. On the other, the brake control device 24 receives the respective braking pressure individually effective for the generation of braking force in the individual force generators 16, 17. In FIG. 2, the force generator 16 with the brake block 14 may be regarded as the first friction brake device. The force generator 17 and the second brake block 15 may be regarded as the second friction brake device. Self-evidently, both friction brake devices may have associated brake linkages and attachments which are not shown. The main control valve arrangement 20 together with the friction brake devices may be regarded as the pneumatic brake apparatus.

The friction brake devices may also be disk brakes instead of block brakes. In this case, too, a respective braking effect sensor which is able to detect a braking force and/or a braking torque exerted during braking and to transmit corresponding braking data to the electronic brake control device 24 may be provided. The brake control device 24 is configured to receive braking effect data from the braking effect sensors 18, 19 and braking pressure data from the braking pressure sensors 21, 31, 33. Furthermore, the brake control device 24 associates the braking pressure data with corresponding braking effect data and monitors the mutually associated data. The brake control device 24 may correspond to the control device mentioned in connection with FIG. 1. It is possible that a braking effect sensor is associated with each wheel of a rail vehicle. However, it is also possible to provide only one braking effect sensor, with which a friction brake device is associated, on each bogie or each car or vehicle element. It may even be provided that no braking effect sensor is associated with any friction brake device. Especially in the example of FIG. 1, it may be advantageous to provide a braking effect sensor only on the middle bogie 110, which sensor may be associated with the wheel axle, or with the corresponding friction brake device, arranged at the front in the direction of travel. On the basis of data of such a braking effect sensor, the control device can calibrate the braking effect determined from other parameters.

Figure 3:
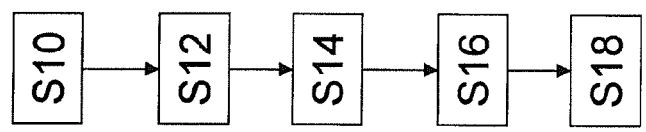
FIG. 3 is a schematic flow diagram of a method for determining a braking effect exerted during a braking process of a rail vehicle.

FIG. 3 shows schematically a flow diagram of a method for determining a braking effect exerted during a braking process of a rail vehicle. The rail vehicle may be, for example, the rail vehicle shown in FIG. 1 which may have a brake system shown in FIG. 2. In a step S10, a control device detects a braking pressure or a braking current. The braking pressure or braking current may be received, for example, by a sensor device. Alternatively or additionally, in step S10 the control device may acquire from a force sensor arrangement at least one longitudinal force acting between parts of the rail vehicle. In a step S12 performed optionally in parallel therewith the control device receives data for at least one further parameter. In particular, data relating to a change over time of a speed, in particular of a vehicle speed, may be captured or determined in step S12. In an optional step S14, the control device may associate data relating to the braking pressure or to the braking current and data relating to the at least one further parameter appropriately with one another, for example by establishing a suitable time correlation.

Analogously, an association of longitudinal force with a change of a speed over time may take place. In a step S16, the control device determines a braking effect on the basis of the braking pressure data or braking current data, and the data relating to the at least one further parameter. A step S18, in which the control device outputs the braking effect which has been determined, and/or carries out an activation of the brake system of the rail vehicle on the basis of the braking effect determined, may be provided.

The features of the invention disclosed in the preceding description, in the drawings and in the claims may be essential to the implementation of the invention both singly and also in any combination.

LIST OF REFERENCES

10 Brake system
12 First wheel
13 Second wheel
14 First brake block
15 Second brake block
16 First force generator
17 Second force generator
18 First braking force sensor
19 Second braking force sensor
20 Main control valve arrangement
21 Main brake pressure sensor
22 Compressed air reservoir
24 Brake control device
30 First wheel rotational speed sensor
31 First braking pressure sensor
32 Second wheel rotational speed sensor
33 Second braking pressure sensor
100 Rail vehicle
102 Front vehicle element
104 Rear vehicle element
106 Coupling device
108 Bogie
110 Bogie
112 Bogie
114 Wheel
116 Rail

The invention claimed is:

1. A control device for a brake system of a rail vehicle, with a friction brake device dependent on non-positive engagement, the control device configured to:
   detect a braking current;
   determine a longitudinal force acting between parts of the rail vehicle;
   receive data for at least one further parameter;
   establish a time correlation between braking current data and data the for at least one further parameter;
   determine a braking effect corresponding to the braking process based on the braking current data, longitudinal force data, and the at least one further parameter; and
   activate a brake system in response to the determined braking effect.

2. The control device of claim 1, wherein the control device is configured to detect and/or to determine the braking current for more than one friction brake device of the friction brake apparatus.

3. The control device of claim 1, wherein the at least one further parameter includes a deceleration.

4. The control device of claim 1, wherein the at least one further parameter includes a vehicle speed and/or at least one wheel rotational speed.

5. The control device of claim 1, wherein the at least one parameter includes a change in the rotational speed of at least one wheel.

6. The control device of claim 1, wherein the control device is configured to monitor a time progression of the braking current and of the at least one further parameter during the braking process.

7. The control device of claim 1, wherein the control device is configured to activate test braking processes.

8. A brake system for a rail vehicle comprising:
   a friction brake device dependent on non-positive engagement, and
   a control device as claimed in claim 1.

9. A method for determining a braking effect exerted during a braking process of a rail vehicle, the method comprising:
   detecting a braking current;
   determining a longitudinal force acting between parts of the rail vehicle;
   receiving data for at least one further parameter;
   establishing a time correlation between braking current data and data the for at least one further parameter;
   determining a braking effect corresponding to the braking process based on the braking current data, longitudinal force data and the at least one further parameter; and
   activating a brake system in response to the determined braking effect.

10. A system for determining braking effect for a brake system of a rail vehicle consisting of:
   an accelerometer configured to measure the change of speed of the rail vehicle over time,
   at least one force transducer configured to measure longitudinal forces between different cars of the rail vehicle; and
   a control device configured to determine a braking effect at least an individual car of the rail vehicle during a braking process based on input from the accelerometer and the force transducer and activate the brake system in response to the determined braking effect.

* * * * *